US008166603B2

(12) United States Patent
Varner et al.

(10) Patent No.: US 8,166,603 B2
(45) Date of Patent: May 1, 2012

(54) COMPOUND WATER-WIPER AND PET HAIR/FUR REMOVAL APPARATUS AND METHOD

(76) Inventors: Donald Varner, Hollister, CA (US); Tom Palecki, Cornville, AZ (US)

( * ) Notice: Subject to any disclaimer, the term of this patent is extended or adjusted under 35 U.S.C. 154(b) by 0 days.

(21) Appl. No.: 12/922,480

(22) PCT Filed: Sep. 17, 2008

(86) PCT No.: PCT/US2008/076715
§ 371 (c)(1),
(2), (4) Date: Jan. 5, 2011

(87) PCT Pub. No.: WO2009/114037
PCT Pub. Date: Sep. 17, 2009

(65) Prior Publication Data
US 2011/0113579 A1    May 19, 2011

(51) Int. Cl.
*A47L 13/11* (2006.01)
(52) U.S. Cl. ........ 15/245; 15/143.1; 15/236.07; 132/148
(58) Field of Classification Search ................. 15/143.1, 15/245, 245.1, 236.07; 119/618, 619, 625, 119/633; 132/148, 150, 156, 219; D28/31; D30/158, 159; D32/41
See application file for complete search history.

(56) References Cited

U.S. PATENT DOCUMENTS

| | | | | | |
|---|---|---|---|---|---|
| 754,949 | A | * | 3/1904 | Wilcox | 132/156 |
| 873,258 | A | * | 12/1907 | McDonnell | 132/148 |
| 923,399 | A | * | 6/1909 | Young | 132/112 |
| 1,904,090 | A | * | 4/1933 | Shaw | 132/143 |
| 2,164,385 | A | * | 7/1939 | Carson | 132/148 |
| 2,505,005 | A | * | 4/1950 | Adolph | 601/137 |
| 2,828,502 | A | * | 4/1958 | Tupper | 15/121 |
| 3,514,789 | A | * | 6/1970 | Villers | 2/200.3 |
| D297,276 | S | * | 8/1988 | Siler et al. | D32/46 |
| 4,970,749 | A | * | 11/1990 | Priore | 15/236.02 |
| 5,231,999 | A | * | 8/1993 | Schroettner | 132/137 |
| 5,287,584 | A | * | 2/1994 | Skinner | 15/167.1 |
| D353,915 | S | * | 12/1994 | Lanne | D30/159 |
| D363,364 | S | * | 10/1995 | Newman | D28/28 |
| 6,126,756 | A | * | 10/2000 | Varner | 134/6 |
| 6,546,589 | B1 | * | 4/2003 | Job | 15/245 |
| D571,968 | S | * | 6/2008 | Talesfore et al. | D32/41 |
| 2002/0100135 | A1 | * | 8/2002 | Machesky | 15/245 |
| 2006/0272117 | A1 | * | 12/2006 | Crisswell | 15/236.05 |
| 2007/0277340 | A1 | * | 12/2007 | Lee | 15/245 |

* cited by examiner

*Primary Examiner* — Randall Chin
(74) *Attorney, Agent, or Firm* — LaRiviere, Grubman & Payne, LLP (57) ABSTRACT

An apparatus and method that efficiently removes water from a surface without the need for a towel and effectively removes hair or fur from a surface. The apparatus is designed to provide a comfort gripping region to a human hand to facilitate ease in use. The material that the apparatus is made from can be static electric attracting to more effectively remove charged particles such as hair or fur from a surface. The apparatus may have various flex edges, including combs, slits and bulges.

7 Claims, 7 Drawing Sheets

COMPOUND WATER-WIPER AND PET HAIR/FUR REMOVAL APPARATUS AND METHOD

PRIORITY CLAIM

This patent application claims priority based upon Patent Cooperation Treaty Utility Application Serial Number PCT/US08/56966 filed on Mar. 14, 2008 which claims priority to U.S. Provisional Patent Application Ser. No. 60/894,735 filed on Mar. 14, 2007.

TECHNICAL FIELD

This invention is directed to an apparatus and methods for removing excess water and/or hair and fur from a variety of surfaces. The apparatus and methods for removing excess water and/or hair and fur in the present invention encompasses multiple applications for use in the bath and body industry for both people and pets. In particular, the present invention relates to an apparatus and methods for removing excess water and hair or fur from surfaces such as a human body, animal, or clothing. The surfaces for which the present invention can be used to remove excess water generally includes any surface for which a towel or chamois material could be used. The surfaces for which the present invention can be used to remove dead hair or fur generally include an animal's body, such as a pet, or clothing and furniture.

BACKGROUND ART

The bath and body industry is constantly evolving to provide the consumer with the latest and greatest gadget to simplify one's life. Currently there is an unmet need for accessories that remove water from a surface other than a towel that must be washed and dried. There is not an effective tool to remove water from a surface, such as one's body or a pet's body, that quickly removes the water and is immediately ready to be used again. Additionally, there are no tools that when drying or brushing a pet, also effectively remove dead hair or fur. The present invention combines these multiple uses into one apparatus, saving precious time while delivering results.

DISCLOSURE OF INVENTION

The present invention addresses the need for an apparatus that efficiently removes water from a surface without the need for a towel and effectively removes hair or fur from a surface. The invention further provides a handle which may be fitted to the human hand on the apparatus for easier use of the apparatus in removing water or hair or fur from a surface. Further, the material that the apparatus is made from can be static electric attracting, in order to more effectively remove charged particles such as hair or fur from a surface. The apparatus may also include a comb edge which can further provide efficient fur and hair removal from a surface. A second edge on the apparatus can provide further drag over a surface to collect even more hair or fur.

BRIEF DESCRIPTION OF DRAWINGS

For fuller understanding of the present invention, reference is made to the accompanying drawings numbered below. Commonly used reference numbers identify the same or equivalent parts of the claimed invention throughout the several figures.

FIG. 1a is a top view of a flex edge apparatus according to an embodiment of the present invention.
FIG. 1b is an elevation view of the apparatus of FIG. 1a.
FIG. 1c is a section view of the apparatus of FIG. 1b taken along lane A-A.

BEST MODES FOR CARRYING OUT THE INVENTION

Figures 1A, 1B, 1C:
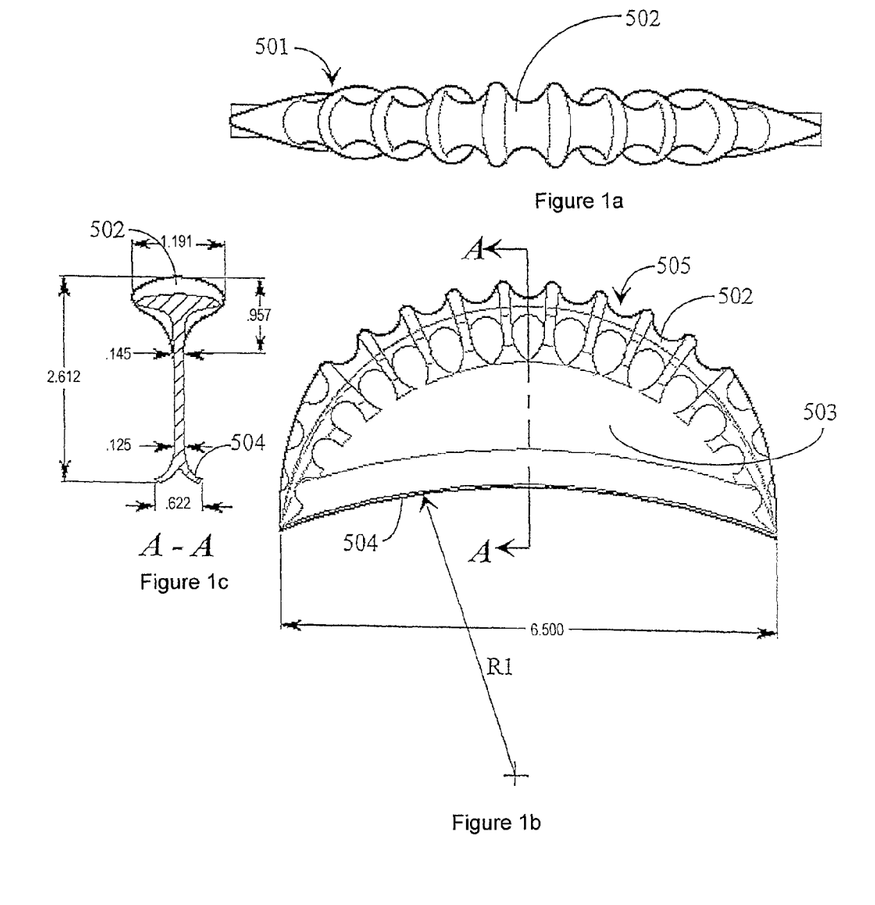

FIG. 1a is a top view of an apparatus 501 in an embodiment of the present invention, FIG. 1b is an elevation view of apparatus 501, and FIG. 1c is a cross-section of apparatus 501 taken along line A-A of FIG. 1b. Apparatus 501 has utility for wiping water and moisture from complex surfaces, for example a human body or animal after a shower or swim. Additionally, the apparatus effectively removes hair and fur from surfaces.

Apparatus 501 has a flex edge region 503 of a substantially constant thickness in one embodiment, joining with a handle region 502 formed in a curved aspect, which may be a circular curve in one embodiment. The flex edge region may in some embodiments be a flexible panel. The apparatus effectively wipes standing water from a complex curved surface due to the flexible panel having an upper long edge and a lower long edge, each of said edges having a different radii of curvature in the plane of the panel. In one embodiment, the radius of curvature of the lower long edge is greater than the radius of curvature of the upper long edge. In the embodiment shown the curvature of handle portion 502 extends over a total arc of greater than 180 degrees, and may be about 200 degrees.

In the embodiment shown handle portion 502 has a width (see cross-section view) of about 1.2 inches, but may vary in other embodiments. The width and height (about 1 inch) of the handle portion may vary in other embodiments. The goal is to provide a comfortable grip for a user's semi-closed hand. Indented regions 505 are provided over at least a portion of the curvature of the handle region to provide a gripping region that allows a sure grip for the user. In the embodiment shown there are such indented regions 505 spaced apart on each side of the handle, but there may be more or fewer in other embodiments. These regions may be extruded with the handle or otherwise molded into the handle parts, or may in some embodiments be added in another way. In some embodiments the handle may be molded in two separate pieces, and the halves may be fastened together with conventional fasteners, such as bolts or screws.

The lower long edge of the panel forms a flex edge having a lip. This aspect may best be seen in FIG. 1c where at a lower edge away from the handle region, flex edge region 503 has a lip region 504. The lip region 504 can be molded to create various tips at the end of the lip region 504, as shown by example in FIGS. 2a-g described below. Further, the lip can comprise a wiping leg, wherein at least one of the wiping legs comprises at least one wiping tip.

In one embodiment, the flex edge region 503 is formed such that the lip region 504, together with a flex cavity 508, forms, in a preferred embodiment, two wiping legs 506 and 507, which may end in wiping tips. In some embodiments the flex edge is formed on just one side, so that only one wiper leg 507 is formed with a single wiping tip.

Figure 2A:
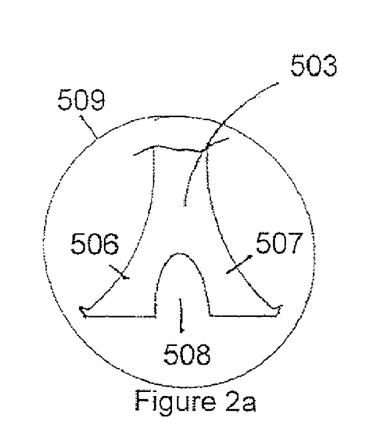
FIG. 2a illustrates a flex edge having a flex cavity with a wiper leg having a triangle wiper tip.

FIG. 2a for example, illustrates in circle 509 the flex edge region 503 is formed such that the lip region 504, together with a flex cavity 508, forms, in a preferred embodiment, two wiping legs 506 and 507, which end in triangle wiping tips.

Figure 2B:
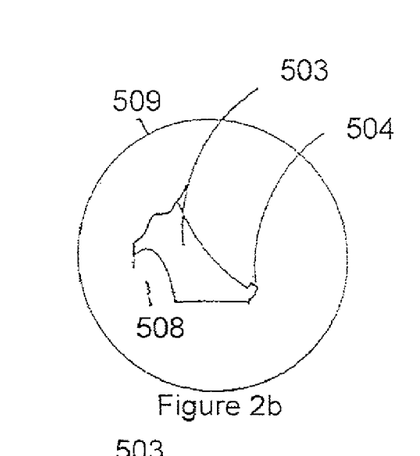
FIG. 2b illustrates a flex edge having a flex cavity with a wiper leg having a square bar wiper tip.

FIG. 2b illustrates an end of a wiper flex edge in an alternative embodiment, shown within circle 509 the flex edge region 503 is formed such that the lip region 504, together with a flex cavity 508, forms, in a preferred embodiment, two wiping legs 506 (not shown) and 507, which end with square bar wiping tips.

Figure 2C:
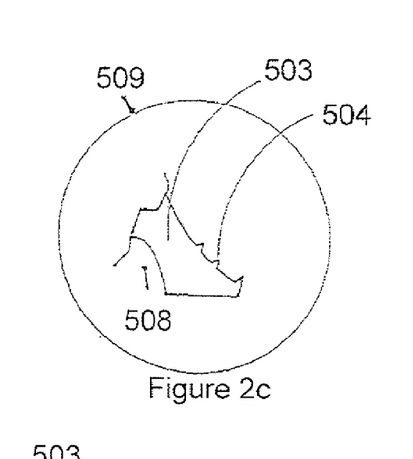
FIG. 2c illustrates a flex edge having a flex cavity with a wiper leg having multiple triangle shaped wiper bars.

FIG. 2c illustrates yet another wiper tip treatment, shown within circle 509 the flex edge region 503 is formed such that the lip region 504, together with a flex cavity 508, forms, in a preferred embodiment, two wiping legs 506 (not shown) and 507, which have multiple triangle shaped wiper bars.

In some embodiments the triangle extension is only at the tip, in some at the tip and one other place higher on the leg, and in some cases only at positions higher on the leg. The lowest one of the extensions typically contacts the surface to be wiped, and a higher one of the extensions helps to channel water to the sides as a surface is wiped.

Figure 2D:
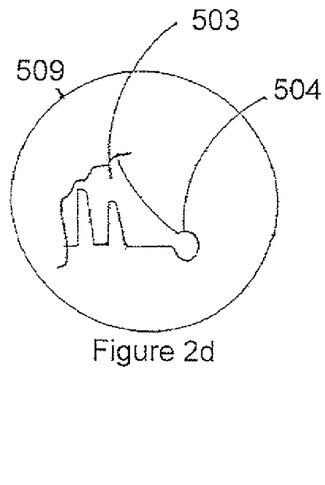
FIG. 2d illustrates a flex edge with a wiper leg having a round wiper bar.

FIG. 2d illustrates yet another treatment of wiper legs in an embodiment of the invention, wherein the tip of the wiper leg is implemented as a round protuberance at the end of the leg forming a round wiper bar.

Figure 2E:
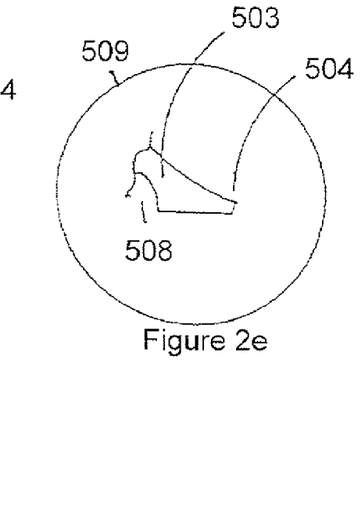
FIG. 2e illustrates a flex edge having a flex cavity with a wiper leg having a square wiper tip.

FIG. 2e illustrates yet another treatment wherein the end of the leg is a square tip. Shown within circle 509 the flex edge region 503 is formed such that the lip region 504, together with a flex cavity 508, forms, in a preferred embodiment, two wiping legs 506 (not shown) and 507, which end with a square tip.

Figure 2F:
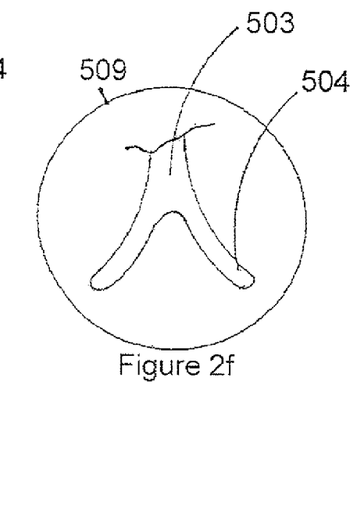
FIG. 2f illustrates a Y-shaped flex edge with rounded wiper tips.

FIG. 2f illustrates yet another treatment with a Y shaped flex edge with round ends. The legs 506 and 507 can maintain a relatively constant wall thickness in this embodiment.

in an alternative embodiment, the flex edge region 503 is formed such that the lip region 504, forms a wiper tip, and the bottom of the flex edge is solid (without a flex cavity).

Figure 2G:
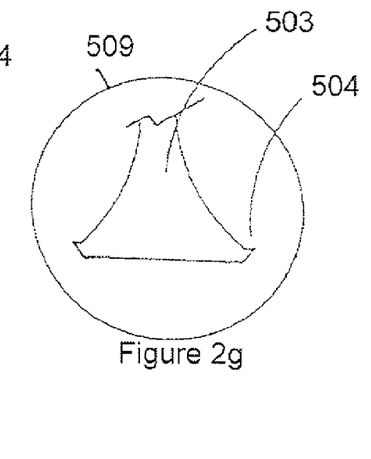
FIG. 2g illustrates a flex edge having a solid bottom with an elongated triangle wiper tip.
Figure 3A:
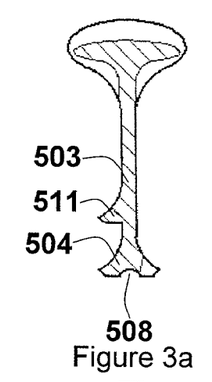
FIGS. 3a-3f illustrates a flex edge having a comb and second flex edge having a lip region.
Figure 3B:
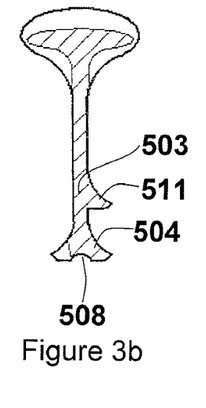
Figure 3C:
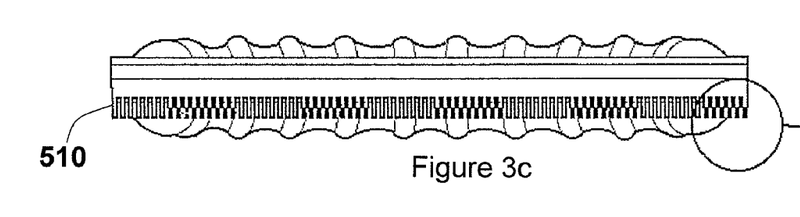
Figures 3D, 3E:
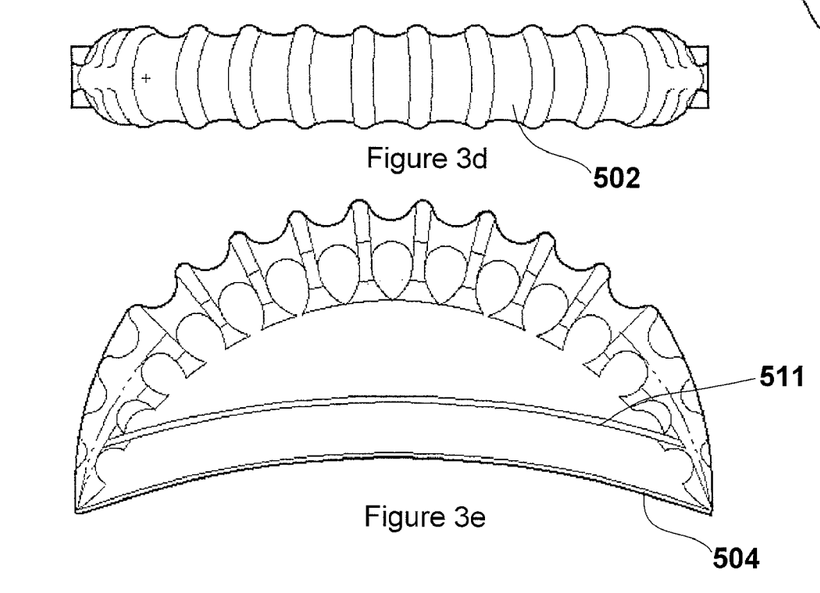
Figure 3F:
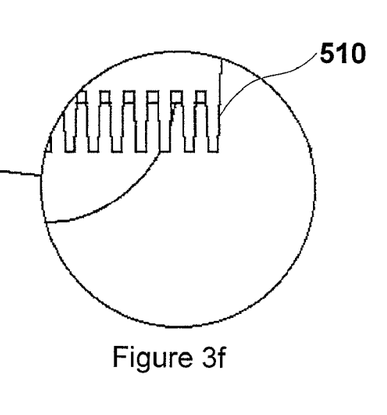

In an alternative embodiment, the flex edge region 503 is formed such that the lip region 504, forms a wiper tip with an elongated triangle, and the bottom of the flex edge is solid (without a flex cavity). FIG. 2g illustrates this alternate embodiment showing a solid flex edge bottom, wherein the wiper tip is an elongated triangle.

In all of these cases the extension, tip or protuberance preferably extends for the full length of the wiper flex edge.

A unique feature of apparatus 501 is a curvature of the flex edge region 503 as shown in elevation view FIG. 1b, as indicated by radius RI. This radius may vary considerably in preferred embodiments from a minimum of about 3 inches to about 6 inches, or even more in some other embodiments. It is this curvature in particular that makes apparatus 501 so useful for removing water and hair or fur from a body, as this curvature allows the flex edge portion to wrap around a person's or animal's appendages, as well as to wipe more planar body areas.

In an alternative embodiment the apparatus 501 only has a curvature of the handle region 502. There is no curvature along the lower edge, resulting in a straight flex edge. This straight edge in particular makes the apparatus 501 useful for removing hair or fur from clothing or a animals body, as this straight edge allows the flex edge portion to collect shedding hair onto the flex edge.

In yet another embodiment, as shown in FIG. 3 the first flex edge 503 comprises a comb edge 510, which is used to drag across the complex surface to collect hair and fur, in particular across the body of an animal. The teeth of the comb edge 510 can be of varying distance from each other depending on the coarseness or thickness of the hair or fur that is being removed.

Figure 4A:
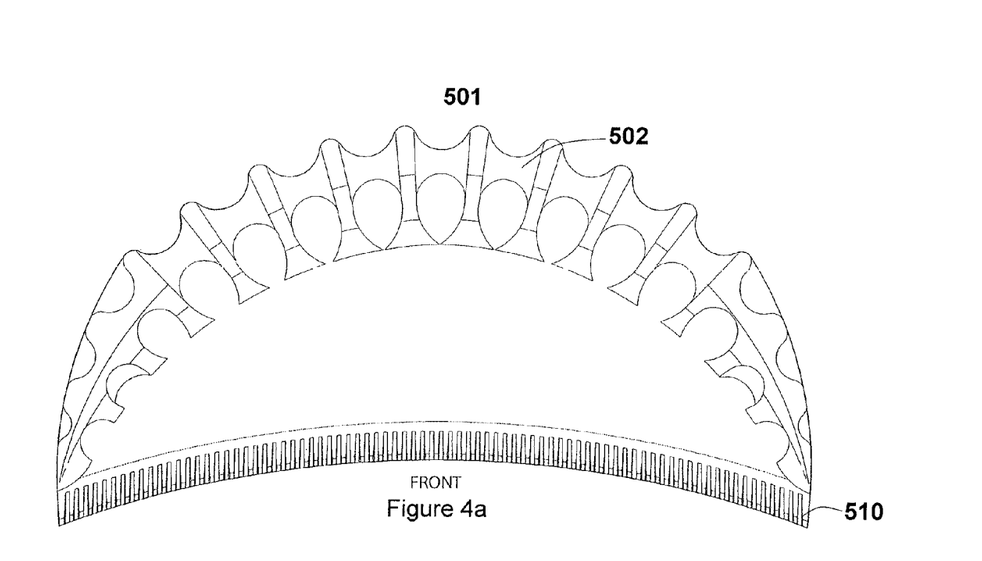
FIGS. 4a and 4b illustrates a flex edge having a comb and second flex edge having a lip region.
Figure 4B:
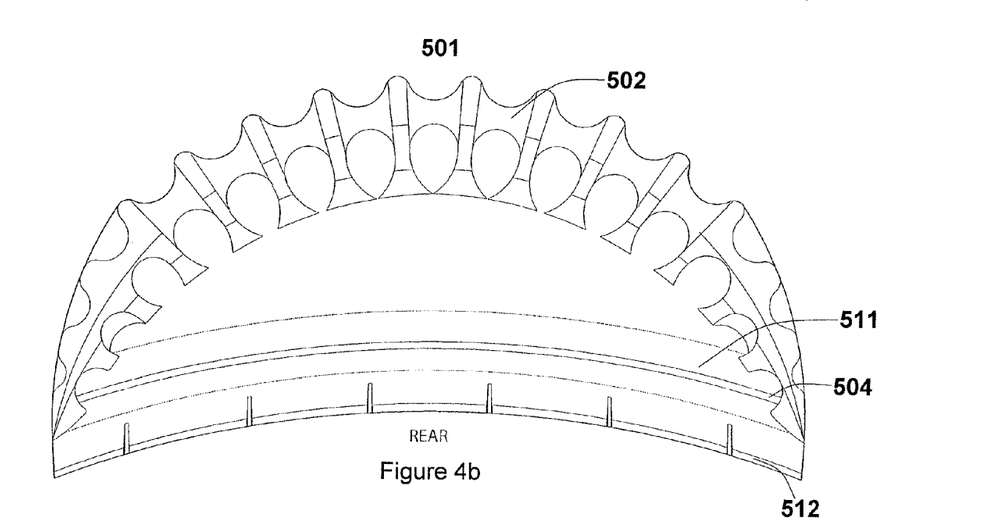

FIG. 4 shows one embodiment of the flex edge 503 having a comb edge 510, the teeth of the comb edge 510 are spaced closely together, while on the opposite side of the flex edge 503 slits are cut into the flex edge 512. To groom an animal the technician may use the flex edge 503 with the comb edge 510 where the teeth are spaced further apart initially to collect hair or fur from the body and then refine the grooming by using the opposite side of the flex edge with slits cut out 512.

Figure 5A:
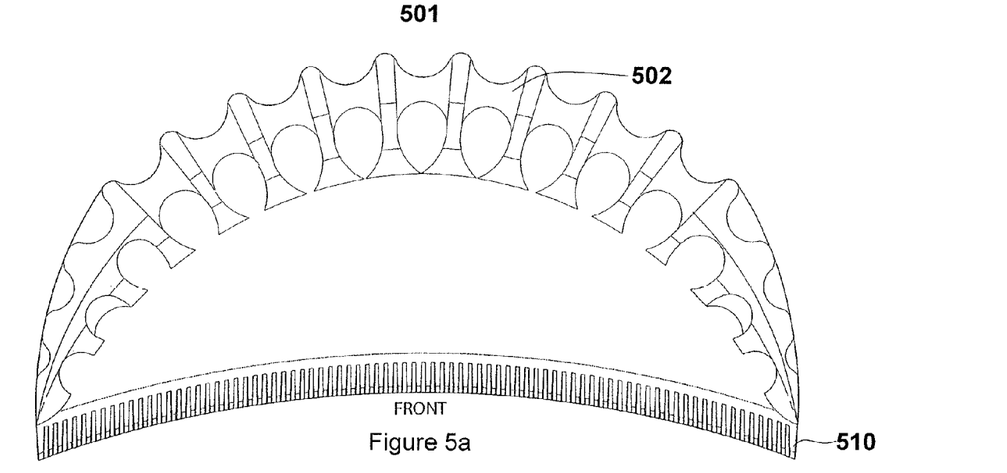
FIGS. 5a and 5b illustrates a flex edge having a comb.
Figure 5B:
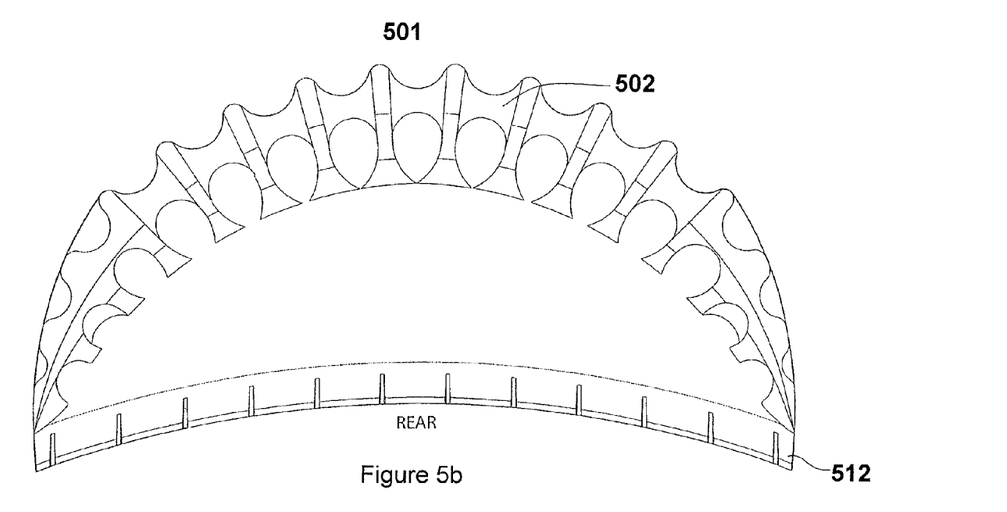

Alternatively, in FIG. 5 one may use the flex edge 503 with the comb edge 510 to remove lint from a complex surface, such as a person's clothes or furniture. One side of the flex edge 503 comb edge 510 may have teeth spaced closely together and the opposite side of the flex edge has slits cut out 512 to facilitate different levels of removal of hair and fur.

Shown in FIGS. 3 and 4, an alternative embodiment has a second flex edge lip 511 formed along the apparatus 501 to further catch dead hair and fur as the apparatus 501 is dragged across the complex surface. This second flex edge lip 511 has a similar lip region 504 that facilitates collecting loose hair and fur. In effect, double collection occurs when the second flex edge lip 511 is on the apparatus due to the first flex edge 503 lip region 504 and second flex edge lip 511 lip region 504 acting in concert to remove loose hair and fur from a complex surface. The second flex edge lip 511 can be used on all variations of the apparatus.

Figure 6:
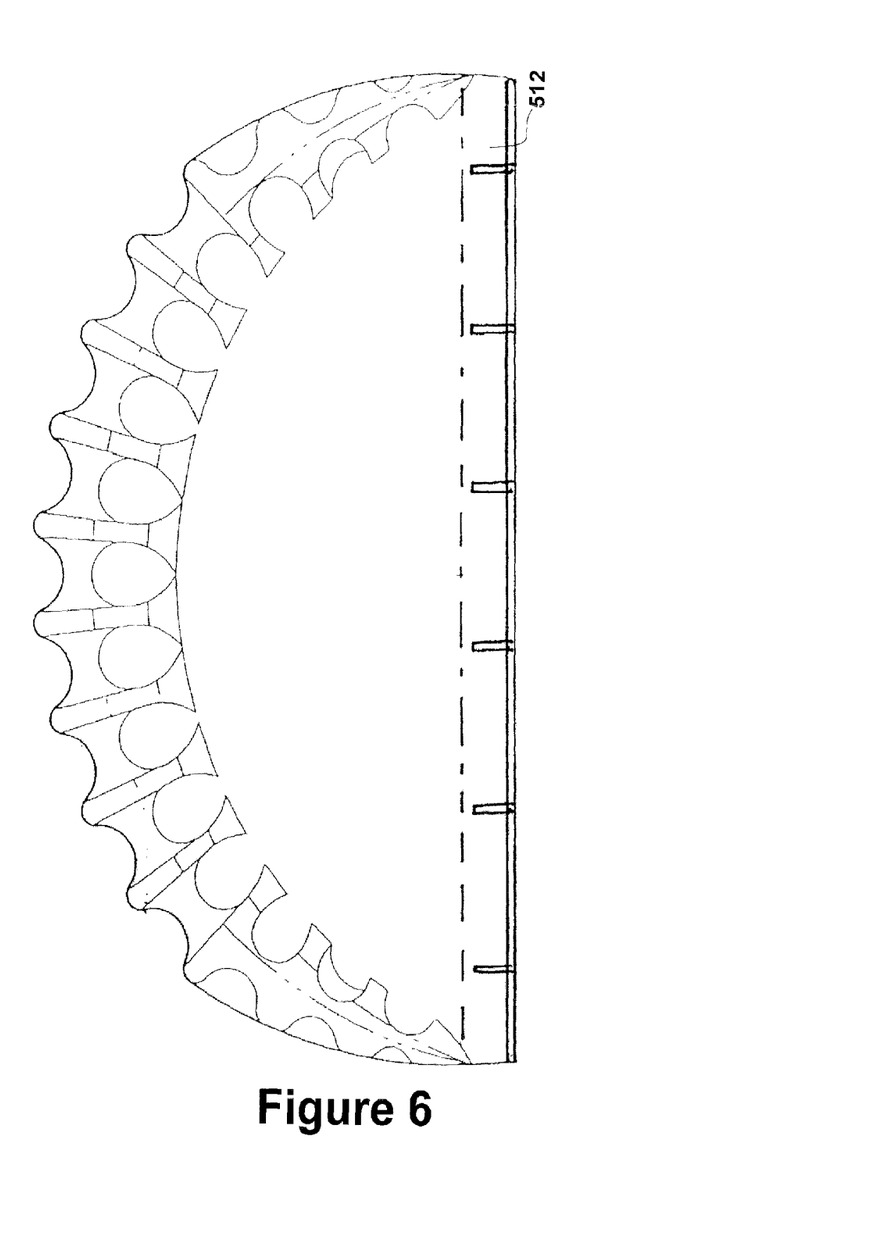
FIG. 6 illustrates an apparatus having a flex edge that bulges outward.
Figure 7:
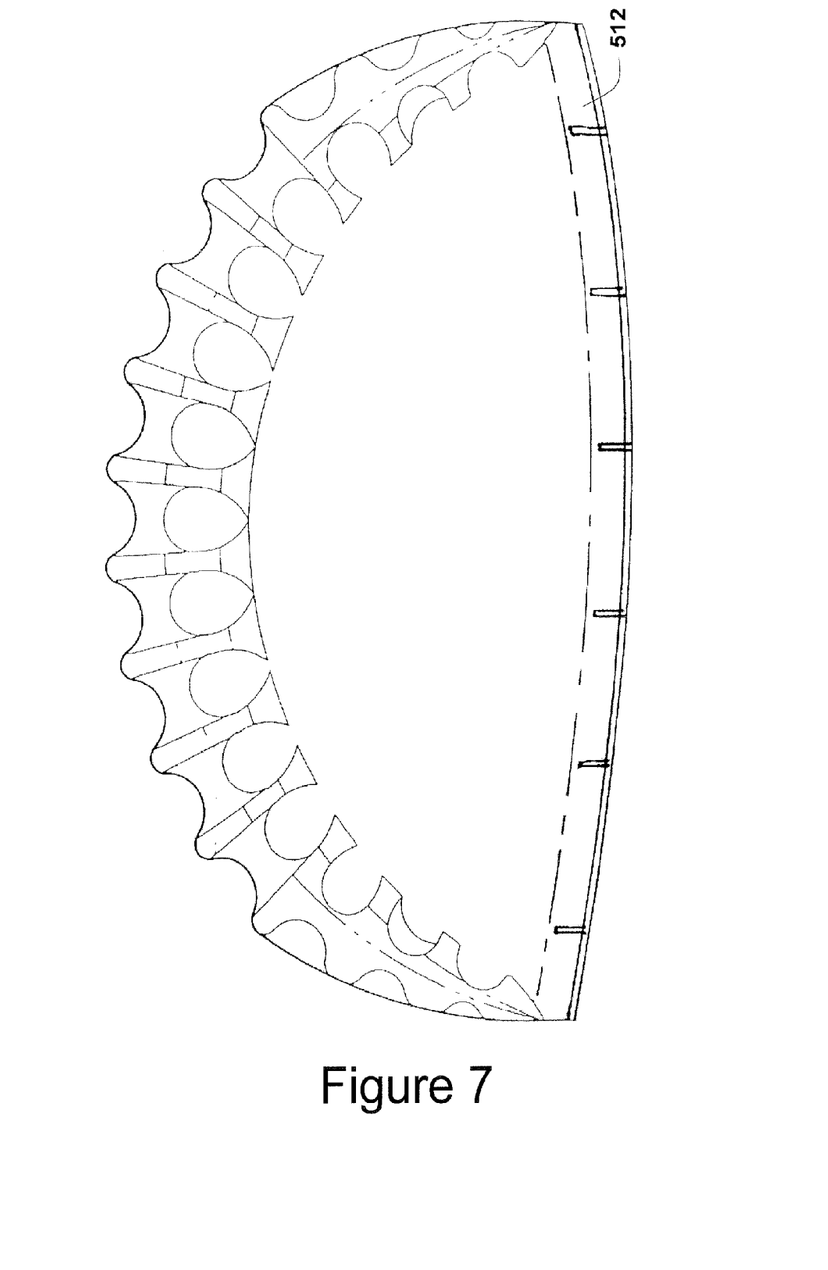
FIG. 7 illustrates an apparatus having a flex edge that bulges outward.

Shown in FIGS. 6 and 7, an alternative embodiment of the flex edge has the flex edge bulge outwards to facilitate maneuvering around complex surfaces. The bulge also facilitates the collection of pet hair and fur while dragging the apparatus across the surface.

In all cases, the apparatus 501, when used on an animal, will collect shedding hair onto the flex edge 503 via static electricity. It is also very effective at removing animal hair from clothing.

In a preferred embodiment the entire apparatus is molded in a single operation, using an appropriate rubber-like material, which in most cases will be a polymer material. The apparatus may also be molded from static electric attracting material in order to facilitate the removal of hair and fur from a surface. In some cases the handle 502 may be made of a firmer material than the flex edge 503, and in some cases a stiffener may be molded into the handle region 502 for extra support. The material may be clear, opaque, or in any of a variety of colors, and color may vary from region to region. The durometer of the material is preferably between 58-60, but may be higher or lower depending on the desired stiffness of the apparatus 501 and the flex region 503 versus the handle region 502.

It will be apparent to the skilled artisan that a number of alterations might be made to the embodiments of the present invention described thus far without departing from the spirit and scope of the invention. For example, there are a variety of materials that might be used in different embodiments. Natural or synthetic rubber might be used, for example, for the flex edge 503 and many rigid and semi-rigid materials, or even metals might be used for the handle 502. There are many ways such a flex edge 503 and a handle 502 might be joined other than the specific ways described above. There are similarly a variety of changes in dimensions that might be made within the spirit and scope of the invention. The inventions illustratively disclosed herein may be practiced without any element which is not specifically disclosed herein. For these and other reasons the invention is only limited by the scope of the claims that follow.

INDUSTRIAL APPLICABILITY

The present invention applies industrially to both the human and pet bath and body industry. More particularly, the present invention applies industrially to water removal from complex surfaces, as well as hair and fur removal from complex surfaces.

What is claimed is:

1. A wiping apparatus for wiping a complex surface, comprising:
   a. curved handle having a width and endpoints:
      i. Having a first finite radius of curvature; and
      ii. A plurality of ridges;
   b. a flexible panel connected to the curved handle, comprising:
      i. a generally smooth and flat surface;
      ii. A curved lower edge having endpoints that converge with the endpoints of the curved handle connected to the flat flexible panel, comprising:
         1. A second finite radius of curvature;
   c. Wherein the first radius of curvature is less than the second radius of curvature; and
   d. Wherein the width of the curved handle decreases in a direction towards the endpoints of the curved handle.

2. The apparatus of claim 1 wherein the curved lower edge forms a comb edge.

3. The apparatus of claim 2, further comprising an upper edge having a lip region above said curved lower edge.

4. The apparatus of claim 3, wherein the upper edge and the curved lower edge comprises a material that is static electrically charged.

5. The apparatus of claim 4, wherein charged particles are collected in the comb edge.

6. The apparatus of claim 1, wherein the curved handle includes a gripping region formed along at least a portion of the curved handle.

7. The apparatus of claim 6 wherein the apparatus is molded from static electric attracting material.

* * * * *